(12) United States Patent
Lance et al.

(10) Patent No.: US 6,422,629 B2
(45) Date of Patent: Jul. 23, 2002

(54) VEHICLE MOUNTED STORAGE UNIT

(75) Inventors: Marshall Lance, Geneva; Polly Sjungels-Butler, Gilbert; Jose Bueno, South Elgin, all of IL (US)

(73) Assignee: Geneva Manufacturing Company, Elgin, IL (US)

( * ) Notice: Subject to any disclaimer, the term of this patent is extended or adjusted under 35 U.S.C. 154(b) by 0 days.

(21) Appl. No.: 09/758,991

(22) Filed: Jan. 10, 2001

Related U.S. Application Data

(63) Continuation of application No. 09/359,333, filed on Jul. 21, 1999, now Pat. No. 6,203,087, which is a continuation-in-part of application No. 09/030,301, filed on Feb. 25, 1998, now abandoned, which is a continuation of application No. 08/861,183, filed on May 21, 1997, now Pat. No. 5,743,584, which is a continuation of application No. 08/457,875, filed on Jun. 1, 1995, now abandoned.

(51) Int. Cl.$^7$ .................................................. B60R 11/06
(52) U.S. Cl. ...................... 296/37.6; 224/403; 224/404
(58) Field of Search ............................ 296/37.6, 37.1, 296/37.8, 37.14; 224/548, 567, 554, 568, 570, 553, 403, 404; 248/503

(56) References Cited

U.S. PATENT DOCUMENTS

| | | | |
|---|---|---|---|
| 3,826,529 A | 7/1974 | Wood ........................ | 296/37 R |
| 4,085,961 A | 4/1978 | Brown ....................... | 296/37.6 |
| 4,249,684 A | * 2/1981 | Miller et al. | |
| 4,469,364 A | 9/1984 | Rafi-Zadeh ................ | 296/37.6 |
| 4,573,731 A | 3/1986 | Knaack et al. ............. | 296/376 |
| 4,789,195 A | 12/1988 | Fletcher ..................... | 296/37.6 |
| 4,889,377 A | 12/1989 | Hughes ........................... | 296/3 |
| D305,315 S | 1/1990 | Fletcher ....................... | D12/157 |
| 4,898,284 A | 2/1990 | Arens ........................ | 211/162 |
| 4,971,234 A | 11/1990 | Hay ......................... | 224/42.32 |
| 5,015,025 A | 5/1991 | Henriquez ................. | 296/37.6 |
| 5,076,630 A | 12/1991 | Henriquez ................. | 296/37.6 |
| 5,121,306 A | 6/1992 | Palmisano ............. | 296/37.6 X |
| 5,232,259 A | 8/1993 | Booker ....................... | 296/37.6 |
| 5,395,019 A | 3/1995 | Christensen ............ | 224/403 X |
| 5,398,987 A | 3/1995 | Sturgis ....................... | 296/37.6 |
| 5,743,584 A | 4/1998 | Lance et al. ................ | 296/37.6 |

OTHER PUBLICATIONS

Hand–numbered documents 1–44.
Hand–numbered documents 50–72.
Hand–numbered documents 101–140.
Sheets 1–6 (numbered in bottom right corner) transmitted to Marshall Lance by facsimile in Nov., 1994.
Snap–On Tools Catalog, 1982, 298 pages.

* cited by examiner

*Primary Examiner*—Joseph D. Pape
(74) *Attorney, Agent, or Firm*—Marshall, Gerstein & Borun

(57) ABSTRACT

A vehicle mounted storage unit, adapted to be mounted to a floor portion of a vehicle having a sidewall and a wheel well that extends outwardly from the sidewall by a first distance, includes a mounting bracket fixed to the floor portion of the vehicle and a plurality of connecting members that connect the mounting bracket to the floor portion. The mounting bracket has a width that is less than the first distance, and the mounting bracket is fixed to the floor portion of the vehicle at a mounting point adjacent the sidewall of the vehicle and adjacent the wheel well of the vehicle. The storage unit is provided with a cabinet that is attachable to the mounting bracket, with the cabinet being removable from the mounting bracket and having a width not greater than the first distance. The cabinet is adapted to be mounted adjacent the sidewall of the vehicle and adjacent the wheel well of the vehicle, with no portion of the cabinet extending beyond the wheel well of the vehicle. The storage unit is also provided with a quick-release mechanism that facilitates attachment of the cabinet to the mounting bracket and release of the cabinet from the mounting bracket, the quick-release mechanism allowing the cabinet to be mounted to the mounting bracket and removed from the mounting bracket without the use of a tool.

10 Claims, 9 Drawing Sheets

US 6,422,629 B2

VEHICLE MOUNTED STORAGE UNIT

This is a continuation of U.S. application Ser. No. 09/359,333, filed July 21, 1999 now U.S. Pat. No. 6,203,087 which is a continuation-in-part of U.S. Ser No. 09/030,301 filed Feb. 25, 1998, now abandoned, which is a continuation of U.S. Ser. No. 08/861,183 filed May 21, 1997, now U.S. Pat. No. 5,743,584, which is a continuation of abandoned U.S. Ser. No. 08/457,875 filed Jun. 1, 1995, all of which are incorporated wholly herein by reference.

BACKGROUND OF THE INVENTION

The present invention relates to a storage unit for installation in a vehicle such as a pickup truck, van, or sport utility vehicle.

U.S. Pat. No. 5,398,987 to Sturgis discloses a tool box assembly for use in the bed of a pickup truck. The tool box assembly is composed of a storage container 24 that is mounted to the bed of the pickup truck and a tool box 26 that is pivotally mounted to the storage container 24 about a vertical pivot axis. The storage container 24 has a door 32 that is movable between an open position and a closed position, and the tool box 26 has a plurality of drawers 134, 135.

As shown in FIG. 1 of the-Sturgis patent, the Sturgis tool box 26 is pivotable between a first position in which the tool box 26 is disposed within the storage container 24 and a second position in which the tool box 26 is disposed outside the storage container 24. When the tool box 26 is in the second position, the drawers 134, 135 of the tool box 26 may be pulled out of the tool box 26 in a direction towards the rear of the pickup truck.

SUMMARY OF THE INVENTION

The invention is directed to a vehicle mounted storage unit adapted to be mounted to a floor portion of a vehicle having a sidewall and a wheel well that extends outwardly from the sidewall by a first distance. The vehicle mounted storage unit includes a mounting bracket adapted to be fixed to the floor portion of the vehicle and a plurality of connecting members adapted to connect the mounting bracket to the floor portion of the vehicle at the mounting point. The mounting bracket has a width that is less than the first distance, and the mounting bracket is adapted to be fixed to the floor portion of the vehicle at a mounting point adjacent the sidewall of the vehicle and adjacent the wheel well of the vehicle.

The storage unit is provided with a cabinet that is attachable to the mounting bracket, with the cabinet being removable from the mounting bracket and having a width not greater than the first distance. The cabinet is adapted to be mounted adjacent the sidewall of the vehicle and adjacent the wheel well of the vehicle, with no portion of the cabinet extending beyond the wheel well of the vehicle. The storage unit is also provided with a quick-release mechanism that facilitates attachment of the cabinet to the mounting bracket and release of the cabinet from the mounting bracket.

The quick-release mechanism may be disposed within an interior portion of the cabinet, and the storage unit may also be provided with a door connected to the cabinet, with the door being movable between an open position in which the quick-release mechanism may be activated and a closed position in which the door prevents access to the quick-release mechanism. The storage unit is also provided with a lock associated with the door to lock the door in the closed position to prevent access to the quick-release mechanism.

The features and advantages of the present invention will be apparent to those of ordinary skill in the art in view of the detailed description of the preferred embodiments, which is made with reference to the drawings, a brief description of which is provided below.

DETAILED DESCRIPTION OF THE PREFERRED EMBODIMENTS

Figure 1:
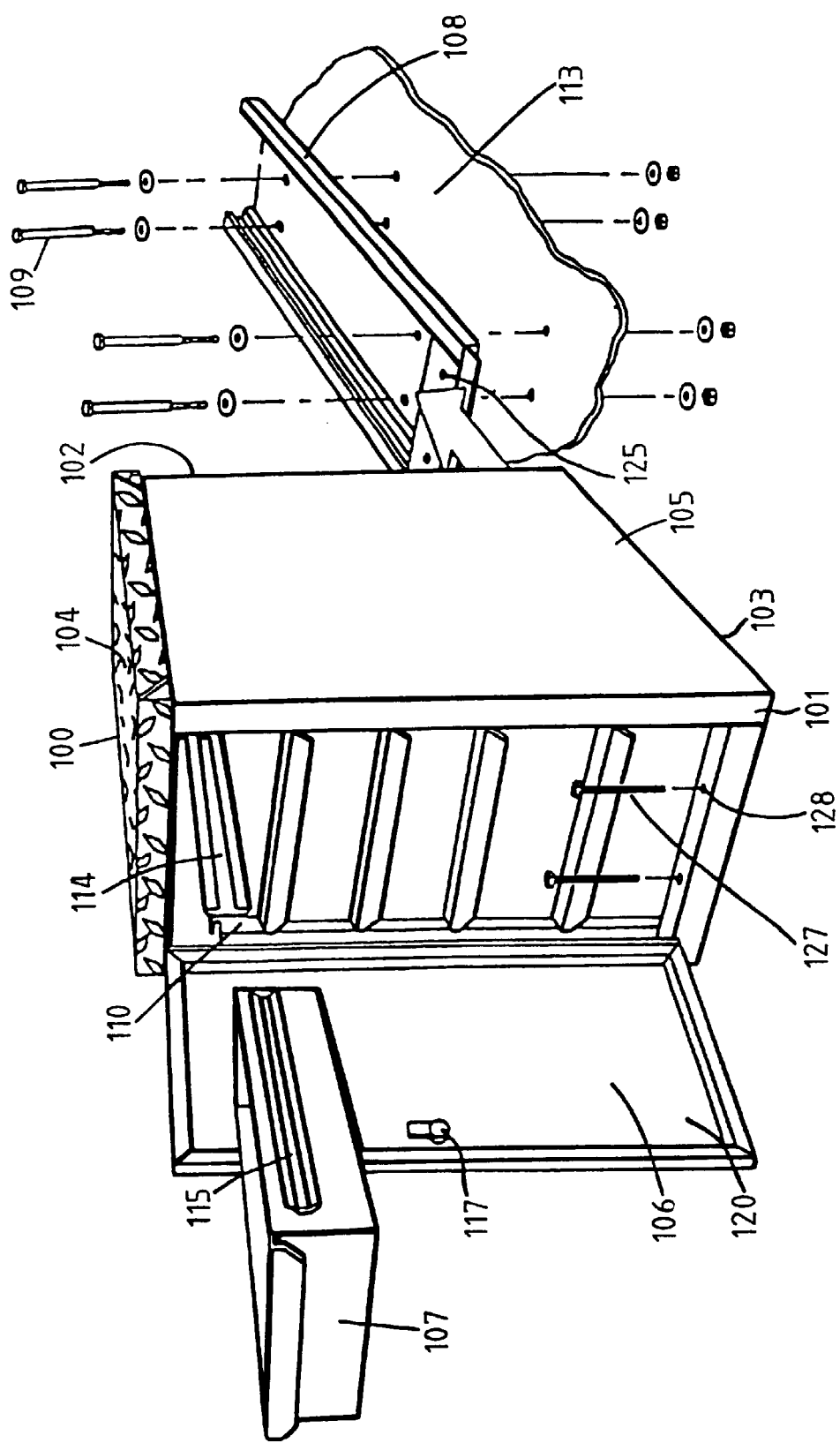
FIG. 1 is a perspective view of a first embodiment of a storage unit in accordance with the invention.
Figure 3:
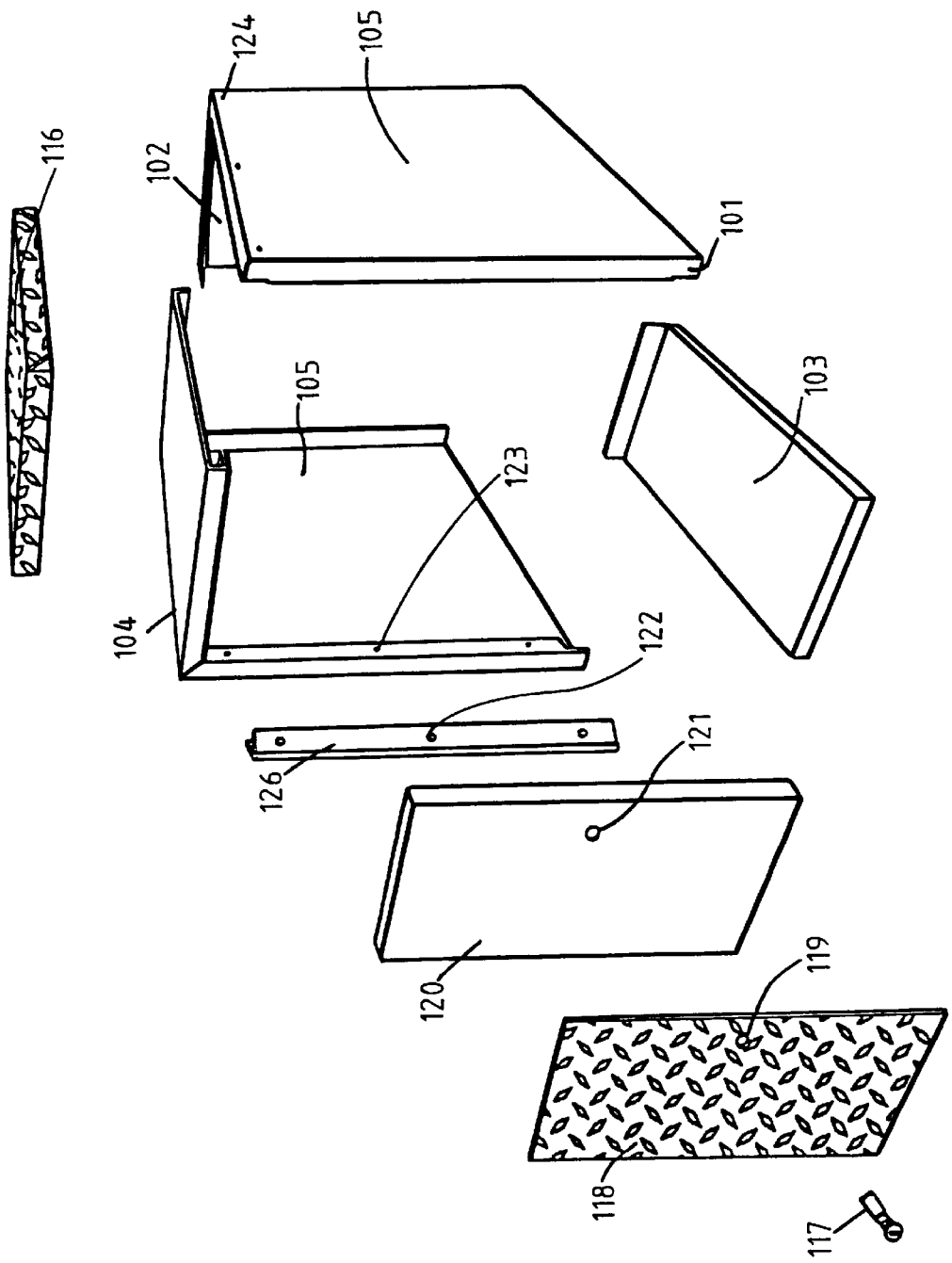
FIG. 3 is a fragmentary, perspective view of the cabinet of the storage unit of FIG. 1.

A storage unit 100 in accordance with one embodiment of the invention is shown in FIGS. 1 and 3. The storage unit 100 comprises a cabinet 106 having a front 101, a back 102, a bottom 103, a top 104 and two sides 105. A door 120 in the front 101 provides access to the contents of the cabinet. As shown in FIGS. 1 and 3, the door 120 is mounted at holes 122 to a continuous hinge 126, which is mounted at holes 123 to the cabinet 106. A cam lock 117 mounted in the door 120 allows the cabinet 106 to be locked, thereby securing the contents.

The cabinet 106 may be mounted to the cargo area of a vehicle by attaching it to a mounting bracket 108, as shown in FIG. 1. The mounting bracket 108 may be bolted 109 or otherwise firmly attached to the floor 113 of the cargo area so that the mounting bracket may not be quickly and easily is removed. The cabinet 106 may then be secured to the mounting bracket 108 by screws 127, which extend through holes 128 in the cabinet into holes 125 in the mounting bracket. Holes 128 are located inside of cabinet 106 such that screws 127 may be inserted or removed only if door 120 is open. This mounting arrangement allows the cabinet 106 to be easily detached and removed from the vehicle by simply removing the screws 127, but deters theft by preventing removal of the cabinet 106 when the door 120 is closed and locked.

The storage unit may be made of any of a variety of materials. For example, the cabinet 106 may be made of sheet metal, and the top 104 and door 120 may be reinforced with aluminum tread plates 116 and 118. The lock 117 extends through the door 120, at hole 121, and through the aluminum tread plate 118, at hole 119. As shown in FIGS. 1 and 3, the panels are joined by rivets 124, but any known method may be used to join the panels. The top 104 and one side 105 may be formed from a single piece of material, and the back 102 and the second side 105 may be formed from a single piece of material. This construction reduces production costs and results in a stronger cabinet.

Figure 2:
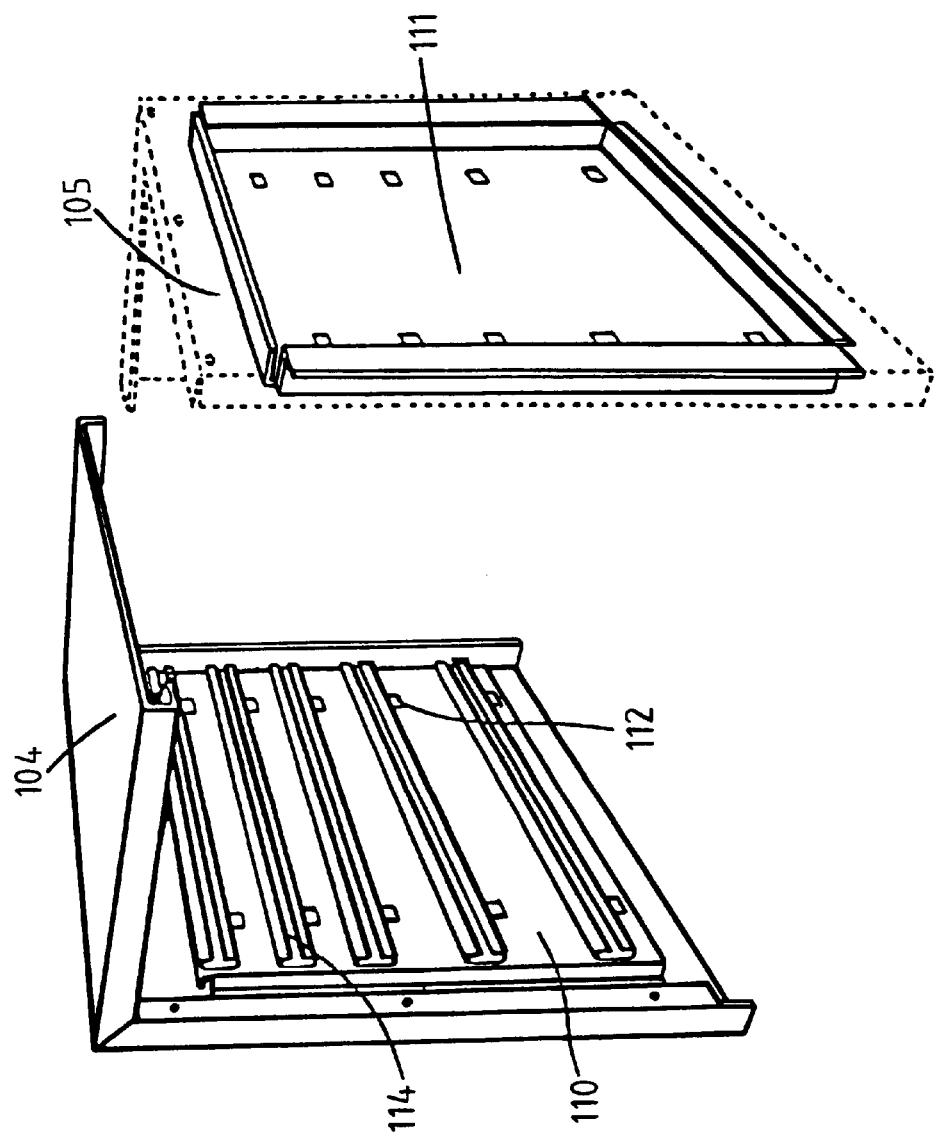
FIG. 2 is a fragmentary, perspective view of a portion of the interior of the cabinet of the storage unit of FIG. 1.

The interior of the cabinet 106 may be fitted with drawers 107 to provide easier access to the contents of the cabinet 106. As shown in FIGS. 1 and 2, to accommodate drawers 107, the interior of the cabinet 106 may be fitted with side walls 111. The side walls may comprise a drawer slide mounting assembly 110 having slide rails 114 on which the drawers 107 may slide, and locating shear forms 112 on which the slide rails 114 may be mounted. Corresponding slide rails 115 may then be mounted on the drawers 107. The slide rails 114 permit the drawers 107 to be fully extended or removed from the cabinet 106, as shown in FIG. 1, so that the entire length of each drawer may be used.

Figure 4:
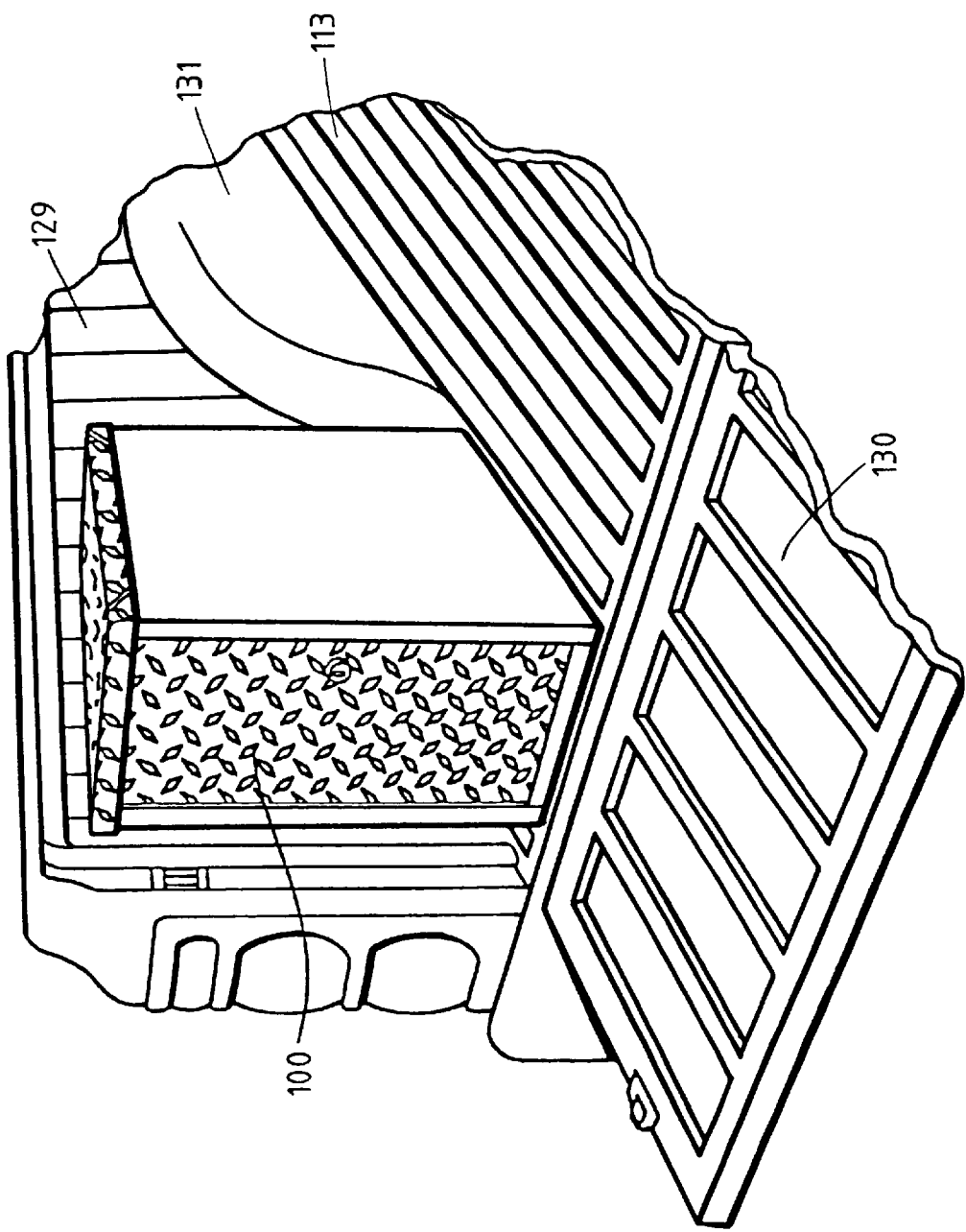
FIG. 4 is a perspective view of a vehicle in which the storage unit of FIG. 1 is installed.

The storage unit 100 may be mounted to the vehicle bed 113, as shown in FIG. 4, along the sidewall of the cargo area 129 behind the wheel well 131 and adjacent to the tailgate or rear 130 of the vehicle. In other types of vehicles, such as vans, the storage unit 100 may be mounted adjacent a rear or side door. These locations allow easy access to the contents of the storage unit, without reaching over the sidewall or climbing into the cargo area, and minimize interference with use of the cargo area for carrying cargo.

Figure 5:
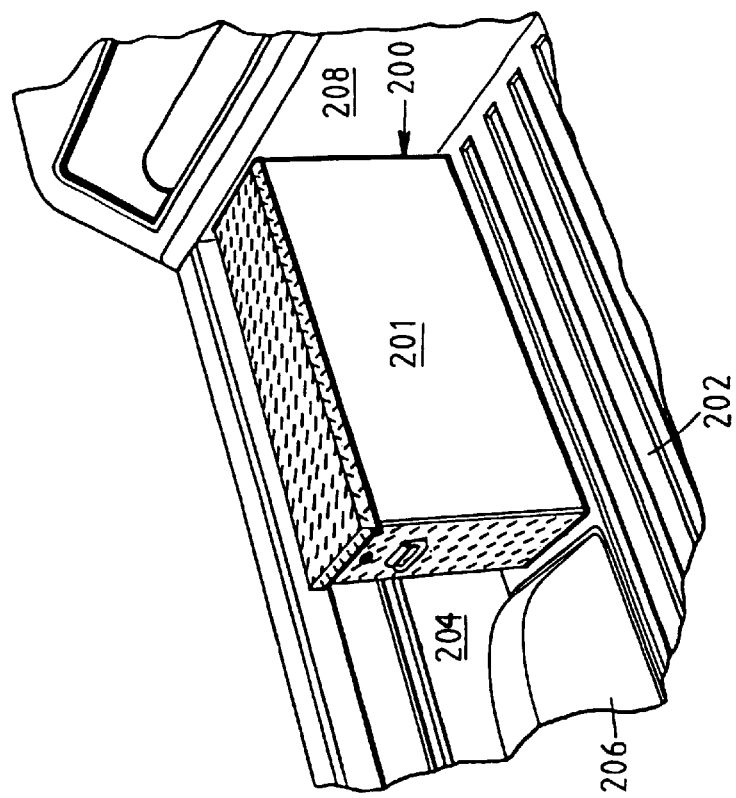
FIG. 5 is a perspective view of a second embodiment of a storage unit in accordance with the invention shown mounted in front of the wheel well of a pickup truck.

A second embodiment of a storage unit 200 in accordance with the invention is shown in FIGS. 5–17. As shown in FIG. 5, the storage unit 200 has a storage cabinet 201 that may be removably mounted to a floor portion 202 of a vehicle, such as a pickup truck, at a mounting location adjacent a sidewall 204 of the vehicle and located between a wheel well 206 of the vehicle and an interior wall surface 208 of the vehicle. The storage cabinet 201 has a width that is not greater than the distance between the sidewall 204 of the vehicle and the outer surface of the wheel well 206 so that when the storage unit 201 is mounted adjacent the sidewall 204, no portion of the storage cabinet 201 extends outwardly beyond the wheel well 206.

Figure 11:
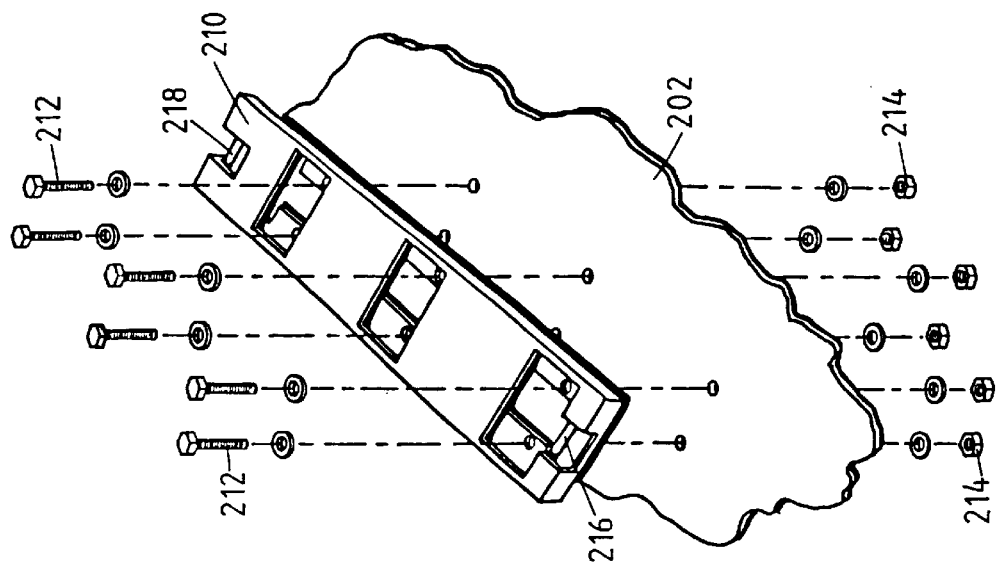
FIG. 11 is an exploded perspective view of how the mounting bracket mounts to the bed of the pickup truck.

The storage unit 201 is removably mounted to the floor portion 202 of the vehicle via a mounting bracket 210 that is fixed to the floor portion 202 of the vehicle. Referring to FIG. 11, the mounting bracket 210 may be fixed to the floor portion 202 of the vehicle in any suitable manner, such as by a plurality of bolts 212 and nuts 214. To facilitate the removable mounting of the storage cabinet 201 to the mounting bracket 210, the mounting bracket 210 has a first connecting rod 216 disposed adjacent one end of the mounting bracket 210 and a second connecting rod 218 disposed adjacent an opposite end of the mounting bracket 210.

Figure 8:
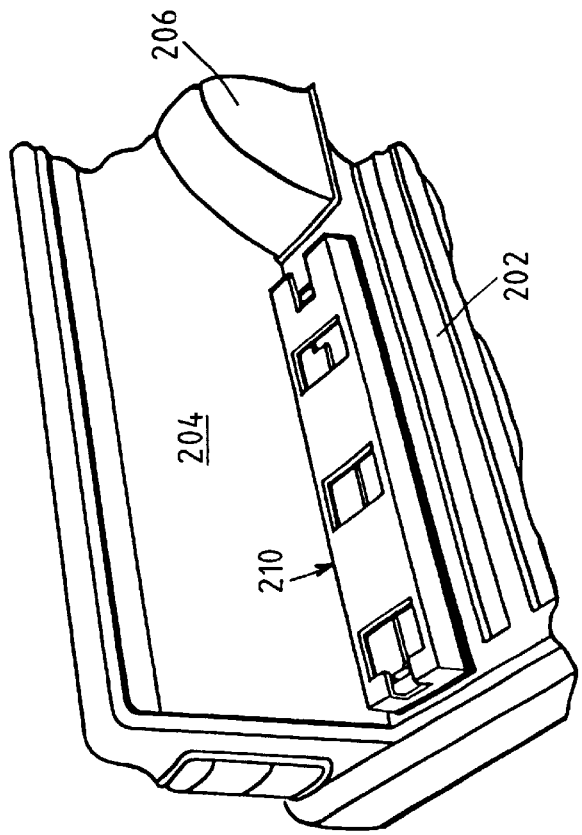
FIG. 8 is a perspective view of the mounting bracket shown mounted behind the wheel well of a pickup truck.
Figure 7:
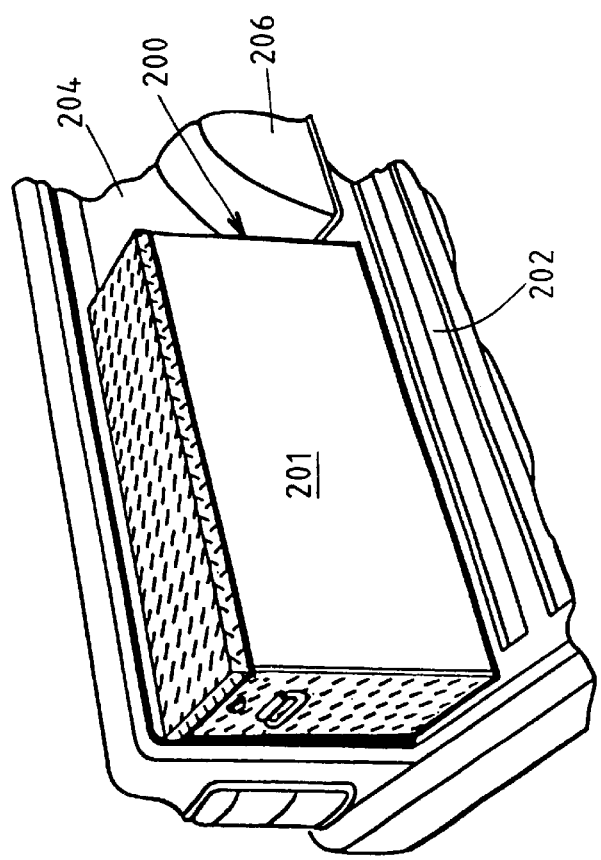
FIG. 7 is a perspective view of the storage unit of FIG. 5 shown mounted behind the wheel well of a pickup truck.

As shown in FIGS. 7–8, the storage cabinet 201 and the mounting bracket 210 may be mounted to the floor 202 of the vehicle at a point behind the wheel well 206, so that the storage cabinet 201 occupies the space adjacent the sidewall 204 of the vehicle and between the wheel well 206 and a rear door (not shown) of the vehicle. When mounted at this location, no portion of the storage cabinet 201 extends beyond the wheel well 206 of the vehicle.

The storage cabinet 201 may be provided with a height that does not exceed the height of the sidewall 204, and the storage cabinet 201 may be provided in different lengths so as to completely fill the space between the wheel well 206 and rear door of the vehicle, when mounted as shown in FIG. 7, or the space between the wheel well 206 and the internal wall 208 of the vehicle, when mounted as shown in FIG. 5.

Figure 10:
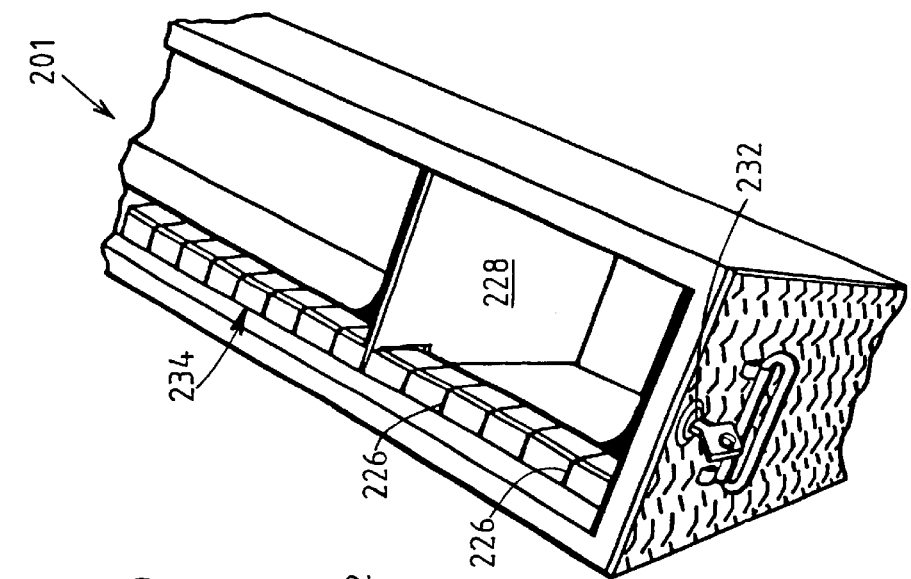
FIG. 10 is a perspective view of the interior of the storage unit of FIG. 5.
Figure 9:
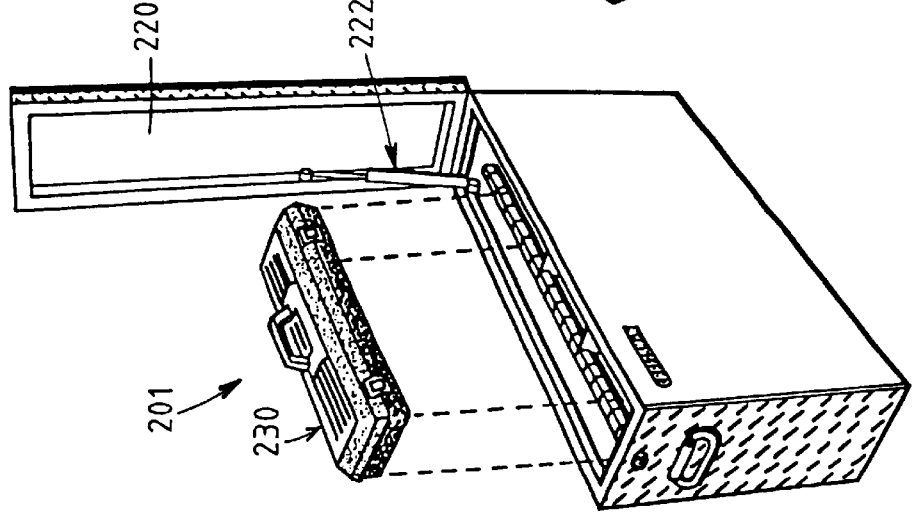
FIG. 9 is a perspective view of the storage unit of FIG. 5 with its lid open.

Referring to FIGS. 9–10, the storage cabinet 201 may have a hinged door 220. The opening and closing of the door 220 may be assisted by a damping assembly, such as a piston-and-cylinder assembly 222. The interior of the storage cabinet 201 may have one or more guide rails 234 having a plurality of slots 226 formed therein, with each of the slots 226 being sized to receive a vertically disposed divider plate 228 for dividing the interior of the storage cabinet 201 into compartments of the desired size. The storage cabinet 201 may be provided with a separate utility box 230, which may be used to store relatively small items, that covers the interior of the storage cabinet 201 and over which the door 220 may be closed. The storage cabinet 201 may also have a lock 232 for locking the door 220 in place in its closed position.

Figure 13:
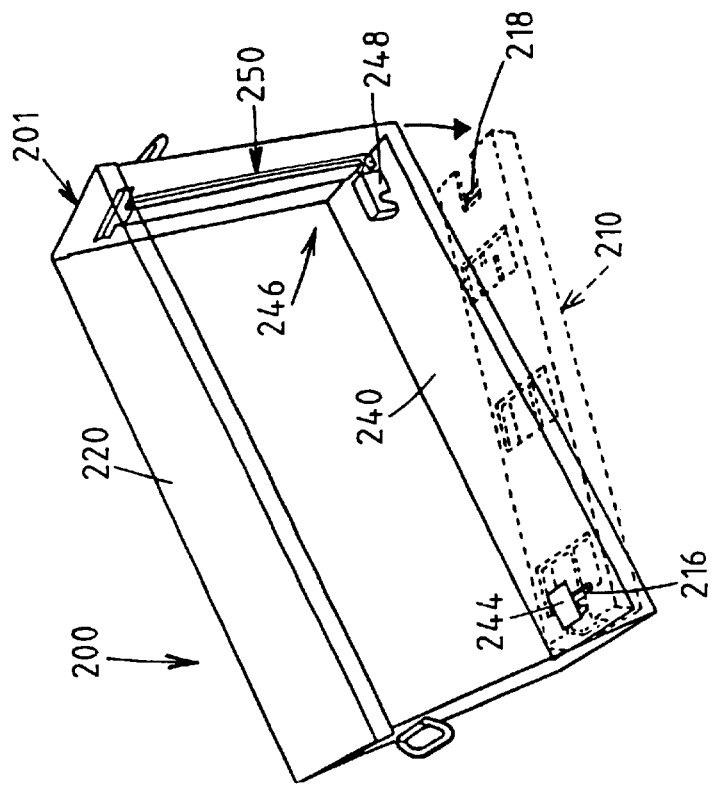
FIGS. 12 and 13 illustrate how the storage unit mounts to the mounting bracket.
Figure 12:
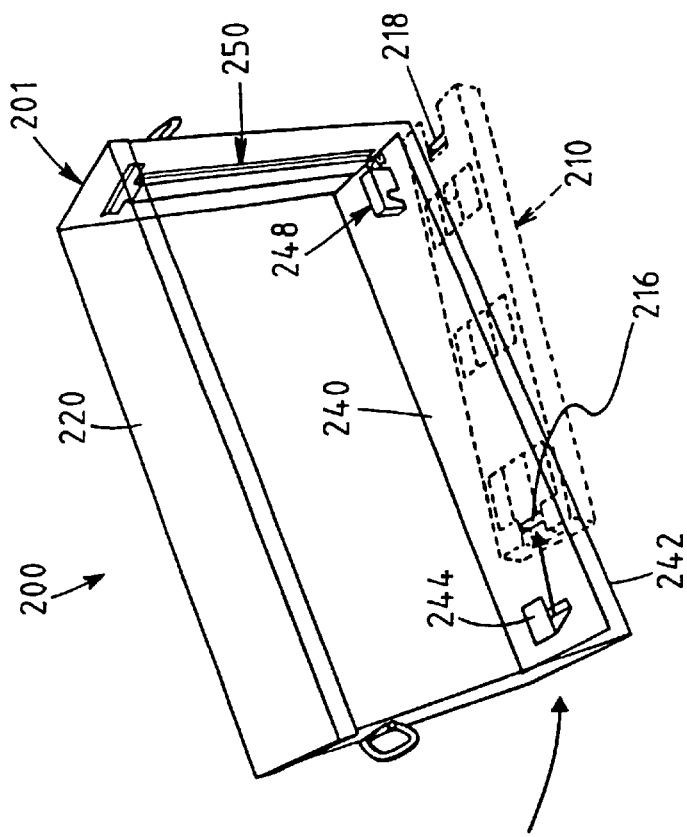
Figure 14:
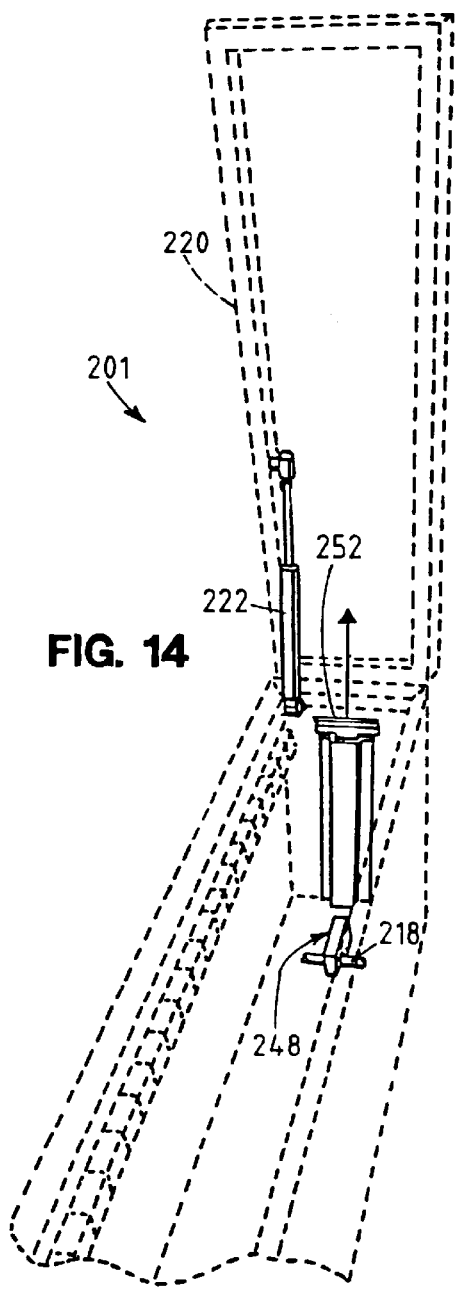
FIGS. 14–18 illustrate various mounting components of the storage unit of FIG. 5.
Figure 15:
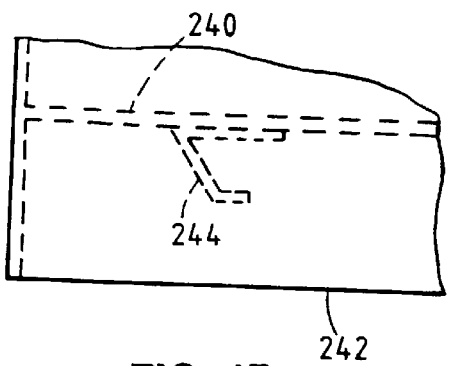

Referring to FIGS. 12–13, the storage cabinet 201 has a horizontally disposed bottom plate 240. As shown in FIG. 15, the bottom plate 240 is disposed at a higher elevation than a bottom rectangular edge 242 of the storage cabinet 201. A latch member in the form of a generally C-shaped latch 244 is mounted to the lower surface of the bottom plate 240, and a quick-release mechanism 246 is disposed in an interior portion of the storage cabinet 201.

The quick-release mechanism 246, which may be designed to allow the cabinet 201 to be mounted to the mounting bracket 210 and removed from the mounting bracket 210 without the use of a tool, such as a screwdriver or wrench, is composed of a latching mechanism 248 and an actuating mechanism 250 operatively coupled to the latching mechanism 248. The latching mechanism 248 is mounted to the underside of the bottom plate 240 adjacent one end of the storage cabinet 201, and the C-shaped latch 244 is mounted to the underside of the bottom plate 240 adjacent the opposite end of the storage cabinet 201.

Figure 16:
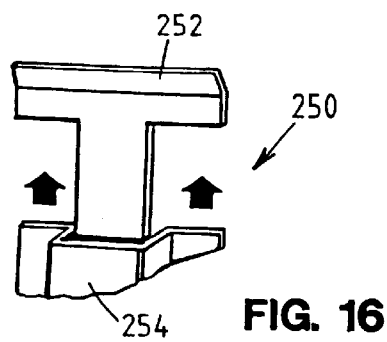
Figure 17:
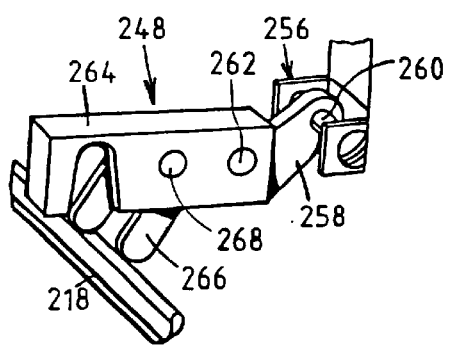

As shown in FIG. 16, the actuating mechanism 250 may comprise a T-shaped actuator 252 that is slidably disposed within a guide member 254 fixed to an end wall of the storage cabinet 201. As shown in FIG. 17, the lower end of the actuator 252 may be connected to, or provided in the form of, a U-shaped connecting member 256. The U-shaped connecting member 256 may be connected to a release arm 258 of the latching member 248 via a bolt 260, with the release arm 258 being pivotally connected to the latching mechanism 248 via a rod 262. The release arm 258 may be spring-biased via a torsion spring (not shown) wrapped around the rod 262.

Figure 18:
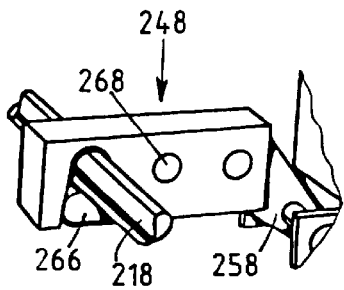

Referring to FIGS. 17–18, the latching mechanism 248 has a housing 264 and a U-shaped latching member 266 which is pivotally connected to the housing 264 via a rod 268. The U-shaped latching member 266 is sized and adapted to receive the connecting rod 218 fixed to the mounting bracket 210. The U-shaped latching member 266 may be spring-biased via a torsion spring (not shown) wrapped around the rod 268.

The U-shaped latching member 266 is operatively coupled to the release arm 258 in the manner described below. When the latching member 266 is pivoted from an unlocked position as shown in FIG. 17 to a locked position as shown in FIG. 18, the release arm 258 is caused to move from a raised position as shown in FIG. 17 to a lowered position as shown in FIG. 18. The U-shaped latching member 266 will remain in its locked position, as shown in FIG. 18, until the release arm 258 is forced to its raised position, as shown in FIG. 17, at which point the latching member 266 will be caused to move to its unlocked position.

Figure 6:
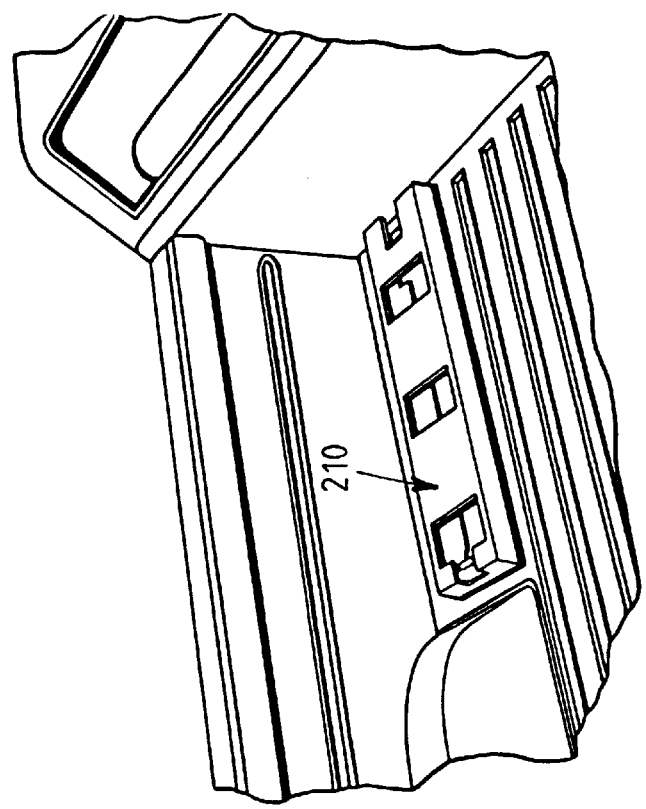
FIG. 6 is a perspective view of a mounting bracket of the storage unit of FIG. 5 shown mounted in front of the wheel well of a pickup truck.

After the mounting bracket 210 is mounted to a desired position, as shown in FIGS. 6 and 8 for example, the storage cabinet 201 may be mounted to the mounting bracket 210. In order to accomplish such mounting, the end of the storage cabinet 201 is moved horizontally relative to the mounting bracket 210, as shown in FIG. 12, until the connecting rod 216 fixed to the mounting bracket 210 is captured within the C-shaped latch 244 fixed to the underside of the storage cabinet 201. Then (with the latch mechanism 248 in its unlocked position as shown in FIG. 17) the opposite end of the storage cabinet 201 may be lowered, with the latching mechanism 248 above the connecting rod 218, until the connecting rod 218 is received within the U-shaped member 266 of the latching mechanism 248. Further downward movement of the storage cabinet 201 will cause the connecting rod 218 to force the latching mechanism 218 from its unlocked position, as shown in FIG. 17, to its locked position, as shown in FIG. 18.

The storage cabinet 201 may be removed from the mounting bracket 210 by pulling up on the actuator 252, which will cause the release arm 258 to pivot upwardly, which in turn will cause the U-shaped latch to move from its locked position as shown in FIG. 18 to its unlocked position as shown in FIG. 17, thus allowing the end of the storage cabinet 201 to be lifted off of the mounting bracket 210, and then slid so that the connecting rod 216 is no longer disposed within the C-shaped latch 244.

The lock 232 (FIG. 10) effectively prevents or deters theft of the storage cabinet 201 since the only way to release the storage cabinet 201 from the mounting bracket 210 is to pull up the actuator 252 and since the actuator 252 is disposed within the locked interior of the storage cabinet 201.

The latching mechanism 248 shown in FIGS. 17 and 18 and described above is a conventional device that is commercially available from Eberhard Manufacturing Co. Although a specific latching mechanism has been described above, the particular type of latching mechanism used is not considered important to the invention, and any type of latching mechanism could be used.

Figure 19:
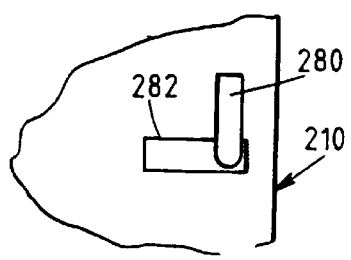
FIG. 19 is a bottom view of a portion of an alternative quick-release mechanism that could be used with the storage unit of FIG. 5.

Referring to FIG. 19, which is a bottom view of a portion of the mounting bracket 210 and a portion of an alternative quick-release mechanism, the alternative quick-release mechanism could be provided in the form of a rotatable rod having an upper end (which could be L-shaped, for example) located at a position generally coinciding with the T-shaped top of the actuator 252 and an L-shaped lower end 280 which is selectively rotatable relative to a slot 282 formed in the mounting bracket 210. When the L-shaped lower end 280 is rotated to its position shown in FIG. 19, in which the lower end 280 is not aligned with the slot 282 in the mounting bracket 210, removal of the storage cabinet 201 (to which the rotatable rod is fixed) from the mounting bracket 210 would be prevented. When the rotatable rod is aligned with the slot 282, so that its lower end 280 may pass through the slot 282, the rotatable rod and the storage cabinet 201 to which it is connected may be removed from the mounting bracket 210.

To prevent the rotatable rod from being inadvertently moved to its unlocked position, the rotatable rod could be spring-biased upwardly, and an upwardly extending groove or indentation (not shown) could be formed in the plate in which the slot 282 is formed, to cause the lower end 280 to become seated within the groove when in the locked position, so that rod could only be rotated by simultaneously pressing down and rotating the rod.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A vehicle mounted storage unit mounted to a floor portion of a vehicle having a sidewall, a wheel well having a portion which extends outwardly from said sidewall by a first distance, and a vehicle surface that is perpendicular to said sidewall, said vehicle surface being spaced from a front portion of said wheel well by a second distance, said vehicle mounted storage unit comprising:

a mounting bracket fixed to said floor portion of said vehicle, said mounting bracket having a length that is not greater than said second distance, said mounting bracket being fixed to said floor portion of said vehicle at a mounting point adjacent said sidewall of said vehicle and between said front portion of said wheel well and said vehicle surface;

a plurality of connecting members that connect said mounting bracket to said floor portion of said vehicle at said mounting point;

a cabinet fixed to said floor portion of said vehicle, said cabinet having a length and a width, said length of said cabinet being not greater than said second distance and said width of said cabinet being less than said length of said cabinet, said cabinet being disposed adjacent said sidewall of said vehicle and between said front portion of said wheel well and said vehicle surface;

a quick-release mechanism that facilitates attachment of said cabinet to said mounting bracket and release of said cabinet from said mounting bracket, said quick-release mechanism allowing said cabinet to be mounted to said mounting bracket and removed from said mounting bracket, said quick-release mechanism being attached to said cabinet adjacent a first end of said cabinet;

a first latch member fixed to said mounting bracket; and a second latch member, said second latch member being coupled to said cabinet adjacent a second end of said cabinet opposite said first end of said cabinet, said second latch member being adapted to connect to said first latch member, said quick-release mechanism and said first and second latch members being structured and positioned to allow said first end of said cabinet to be raised upwardly upon release of said quick-release mechanism while said second end of said cabinet is retained on said floor portion of said vehicle by physical contact between said second latch member and said first latch member.

2. A storage unit as defined in claim 1 wherein said quick-release mechanism is disposed within an interior portion of said cabinet and wherein said storage unit additionally comprises:

a door connected to said cabinet, said door being movable between an open position in which said quick-release mechanism may be activated and a closed position in which said door prevents access to said quick-release mechanism; and a lock associated with said door, said lock locking said door in said closed position to prevent access to said quick-release mechanism.

3. A storage unit as defined in claim 1 additionally comprising a door pivotally connected to said cabinet, said door being movable between an open position in which an interior portion of said cabinet is exposed and a closed position in which said door covers said interior portion of said cabinet.

4. A vehicle mounted storage unit mounted to a floor portion of a vehicle having a sidewall, a wheel well having a portion which extends outwardly from said sidewall by a first distance, and a vehicle surface that is perpendicular to said sidewall, said vehicle surface being spaced from a front portion of said wheel well by a second distance, said vehicle mounted storage unit comprising:

a mounting bracket fixed to said floor portion of said vehicle, said mounting bracket having a length that is not greater than said second distance, said mounting bracket being fixed to said floor portion of said vehicle at a mounting point adjacent said sidewall of said vehicle and between said front portion of said wheel well and said vehicle surface;

a plurality of connecting members that connect said mounting bracket to said floor portion of said vehicle at said mounting point;

a cabinet fixed to said floor portion of said vehicle, said cabinet having a length and a width, said length of said cabinet being not greater than said second distance and said width of said cabinet being less than said length of said cabinet, said cabinet being disposed adjacent said sidewall of said vehicle and between said front portion of said wheel well and said vehicle surface; and a quick-release mechanism that facilitates attachment of said cabinet to said mounting bracket and release of said cabinet from said mounting bracket, said quick-release mechanism allowing said cabinet to be mounted to said mounting bracket and removed from said mounting bracket.

5. A storage unit as defined in claim 4 wherein said quick-release mechanism is attached to said cabinet adjacent a first end of said cabinet and wherein said storage unit additionally comprises:

a first latch member fixed to said mounting bracket; and a second latch member, said second latch member being coupled to said cabinet adjacent a second end of said cabinet opposite said first end of said cabinet, said second latch member being adapted to connect to said first latch member.

6. A storage unit as defined in claim 4 wherein said quick-release mechanism is disposed within an interior portion of said cabinet and wherein said storage unit additionally comprises:

a door connected to said cabinet, said door being movable between an open position in which said quick-release mechanism may be activated and a closed position in which said door prevents access to said quick-release mechanism; and a lock associated with said door, said lock locking said door in said closed position to prevent access to said quick-release mechanism.

7. A storage unit as defined in claim 4 additionally comprising a door pivotally connected to said cabinet, said door being movable between an open position in which an interior portion of said cabinet is exposed and a closed position in which said door covers said interior portion of said cabinet.

8. A vehicle mounted storage unit capable of being mounted to a floor portion of a vehicle having a sidewall, said vehicle mounted storage unit comprising:

a mounting bracket capable of being fixed to said floor portion of said vehicle at a mounting point adjacent said sidewall of said vehicle;

a plurality of connecting members capable of connecting said mounting bracket to said floor portion of said vehicle at said mounting point;

a cabinet capable of being fixed to said floor portion of said vehicle at said mounting point, said cabinet having a length and a width, said length of said cabinet being greater than said width of said cabinet;

a quick-release mechanism that facilitates attachment of said cabinet to said mounting bracket and release of said cabinet from said mounting bracket, said quick-release mechanism allowing said cabinet to be mounted to said mounting bracket and removed from said mounting bracket, said quick-release mechanism being attached to said cab et adjacent a first end of said cabinet;

a first latch member fixed to said mounting bracket; and a second latch member, said second latch member being coupled to said cabinet adjacent a second end of said cabinet opposite said first end of said cabinet, said second latch member being adapted to connect to said first latch member, said quick-release mechanism and said first and second latch members being structured and positioned to allow said first end of said cabinet to be raised upwardly upon release of said quick-release mechanism while said second end of said cabinet is retained on said floor portion of said vehicle by physical contact between said second latch member and said first latch member.

9. A storage unit as defined in claim 8 wherein said quick-release mechanism is disposed within an interior portion of said cabinet and wherein said storage unit additionally comprises:

a door connected to said cabinet, said door being movable between an open position in which said quick-release mechanism may be activated and a closed position in which said door prevents access to said quick-release mechanism; and a lock associated with said door, said lock locking said door in said closed position to prevent access to said quick-release mechanism.

10. A storage unit as defined in claim 8 additionally comprising a door pivotally connected to said cabinet, said door being movable between an open position in which an interior portion of said cabinet is exposed and a closed position in which said door covers said interior portion of said cabinet.

* * * * *